United States Patent
Puseman et al.

(10) Patent No.: US 6,435,042 B1
(45) Date of Patent: Aug. 20, 2002

(54) DEVICE AND PROCESS FOR INSTALLATION OF ENCODER RECEIVER TRANSMITTER ON A GAS METER

(75) Inventors: Paul D Puseman; Steven D Brunmeier, both of Arvada, CO (US)

(73) Assignees: Tru-Check INC, Somerset, KY (US); Public Service Company of Colorado INC, Denver, CO (US)

( * ) Notice: Subject to any disclaimer, the term of this patent is extended or adjusted under 35 U.S.C. 154(b) by 87 days.

(21) Appl. No.: 09/617,066

(22) Filed: Jul. 16, 2000

Related U.S. Application Data

(60) Provisional application No. 60/144,685, filed on Jul. 20, 1999.

(51) Int. Cl.[7] .............................................. G01F 15/06
(52) U.S. Cl. .................... 73/861.78; 73/272 A
(58) Field of Search ........................... 73/861.7, 272 A; 384/281; 248/595, 37.6, 65, 220.2

(56) References Cited

U.S. PATENT DOCUMENTS

| | | | |
|---|---|---|---|
| 3,449,997 A | 6/1969 | Wilbur | |
| 3,555,902 A | * 1/1971 | Onoda et al. | 73/861.78 |
| 4,614,945 A | 9/1986 | Brunius et al. | |
| 5,088,322 A | 2/1992 | Fitzpatrick et al. | |
| 5,421,201 A | 6/1995 | Pellerin, Jr. | |
| 5,673,252 A | 9/1997 | Johnson et al. | |

* cited by examiner

Primary Examiner—Harshad Patel
(74) Attorney, Agent, or Firm—Michael A. Mann; Nexsen Pruet Jacobs & Pollard LLC

(57) ABSTRACT

A process and device for installing an encoder receiver transmitter (ERT) (30) onto a gas meter (20) prevents incorrect installation that otherwise requires meter (20) replacement. The device is a guide bracket (10) having a slot (14) for guiding an input gear (32) of an ERT (30) into engagement with a drive mechanism gear (22) of a gas meter (20). During installation, the customary index and lens are removed so that the drive mechanism gear (22) is exposed; next, the guide bracket (10) is mounted to the meter (20) by placing fasteners (16) through the mounting holes (12) in guide bracket (10) and into the index holes (24) in meter. Once the guide bracket (10) is secured, the input gear (32) is slipped through the slot (14) and a screw (36) is loosely threaded into the upper-right installation hole (34) in the ERT (30) and through the upper-right casing hole (26) in the meter (20) so that the ERT (30) pivots about this point. Next, the ERT (30) is pivoted so that the movement of the input gear (32) follows the slot (14) in the guide bracket (10). The ERT (30) is allowed to pivot until all casing holes (36) align with the installation holes (26) in the meter (20) and secure the ERT (30) to the meter. As this point, the teeth of input gear (32) have meshed correctly and completely with the teeth of drive mechanism (22).

7 Claims, 4 Drawing Sheets

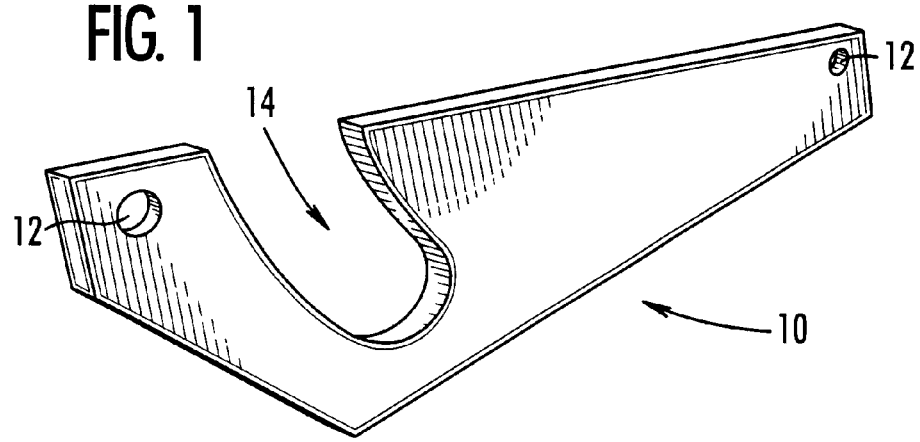
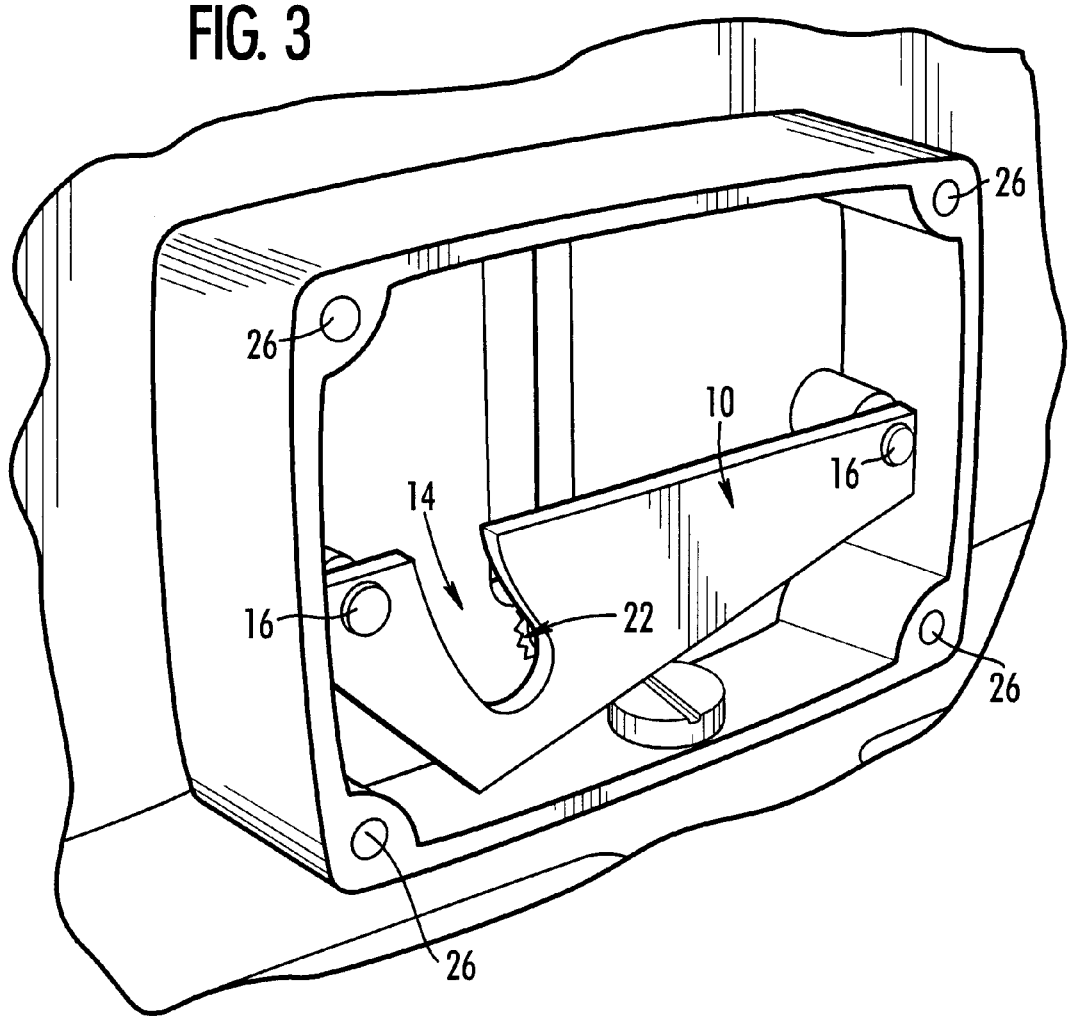

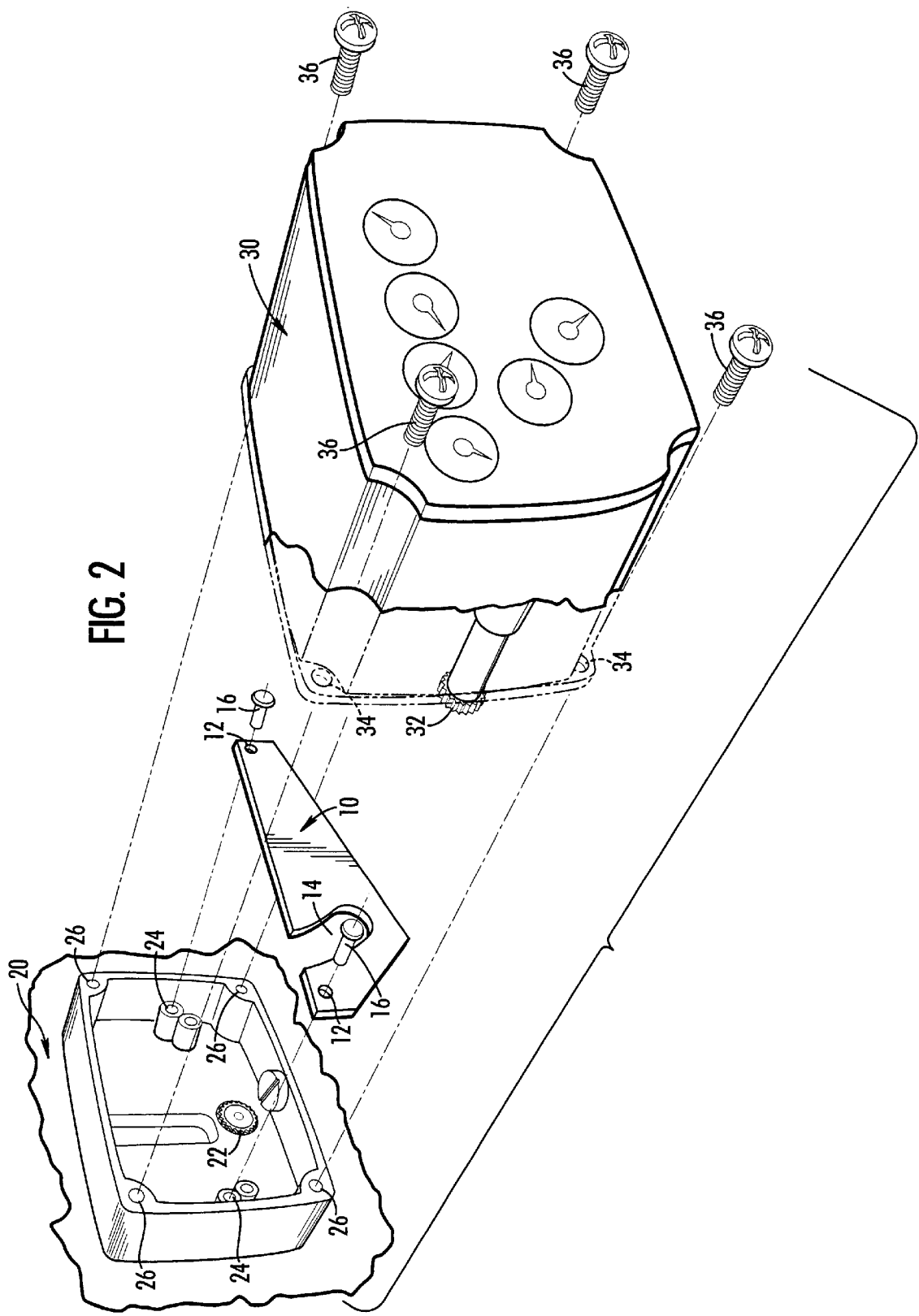

US 6,435,042 B1

DEVICE AND PROCESS FOR INSTALLATION OF ENCODER RECEIVER TRANSMITTER ON A GAS METER

PRIORITY CLAIM

This application claims the benefit of U.S. Provisional Application No. 60/144,685, filed on Jul. 20, 1999, which is incorporated herein by reference.

FIELD OF THE INVENTION

The present invention relates to gas meters. In particular, the present invention relates to a device and process for installing an encoder receiver transmitter (ERT) onto a gas meter so that the gas meter can be read remotely.

BACKGROUND OF THE INVENTION

Historically, gas meters were equipped with a readout dial to enable a utility employee to record gas usage for billing purposes. In order read the meter, the employee would have to look directly at the meter to read the dial. This process would be repeated at each home or business, a time-consuming task.

In recent years, encoder receiver transmitters (ERT) have been developed to transmit a signal related to the gas usage to a remote receiver. The utility employee can simply drive past the building in a vehicle and receive the transmitted usage data without ever leaving the vehicle. U.S. Pat. No. 5,673,252 to Johnson et al. describe a communications protocol for transmitting usage data from a gas meter.

The ERT mounts to the holes in the outer casing of the meter and interfaces to the meter's drive mechanism. The drive mechanism of the meter is a gear that translates the measured volumes of gas into rotations. Prior to ERT installation, the drive mechanism rotated the readout dial to display gas usage; however, the ERT has an input gear that meshes with the drive mechanism gear to tally the number of rotations. By the term mesh, it is meant that the teeth of the gears are engaged. If the ERT is correctly installed, reading meters is greatly simplified and the number of meters that can be read in a given period of time significantly increased. If the ERT is incorrectly installed, however, the meter will seize or break, thereby requiring replacement of the meter. Meter replacement is not only costly for the utility company, but also causes an inconvenience to the customer by the outage.

Since the installation of the ERT does not interfere with the gas stream supplied to a customer, the gas meter gear continues to rotate during installation. As a result, the gears of the drive mechanism and input gear may fail to mesh properly and the teeth between the gears become misaligned and jammed. As a result, parts internal to the meter break or seize, thereby requiring replacement of the meter. Therefore, there is a need for a process and device for installing an ERT that will prevent misalignment of the drive mechanism and input gear.

SUMMARY OF THE INVENTION

According to its major aspects and broadly stated, the present invention is a process and device for installing an encoder receiver transmitter (ERT) onto a gas meter. In particular, the present invention is guide bracket having a slot for guiding an input gear of an ERT to mesh with a drive mechanism of a gas meter. During installation, the customary index and lens are removed so that the drive mechanism is exposed. Then, the guide bracket is attached to the meter using positioning fasteners through the mounting holes in guide bracket and into the index holes in meter. Once the guide bracket is secured, a screw is loosely threaded into the upper-right installation hole in the ERT and through the upper-right casing hole in the meter so that the ERT pivots about this point. Next, the ERT is rotated so that the movement of the input gear is guided by the slot in the guide bracket. Finally, the ERT is allowed to rotated until all casing holes align with the installation holes in the meter and the ERT can be secured to the meter. As this point, the teeth of input gear have meshed with the teeth of drive mechanism.

A major advantage of the present invention is the ability to prevent incorrect installation of the ERT. With the guide bracket having a slot guiding the movement of the input gear, the teeth of the input gear and drive mechanism will inevitable mesh correctly so that the drive mechanism will not fail or cause any internal parts to fail.

The elimination or even the reduction of repair costs for incorrectly installed ERTs is an important advantage of the present invention. The utility company will not only reduce the inconvenience of having to replace gas meters, but will also reduce the cost of and time involved in replacing meters.

Having the input gear follow a curved slot in order to mesh with the drive mechanism gear is an important feature of the present invention. With the curvature of the slot guiding the movement of the input gear, the gears will not be forced together incorrectly. As a result, the teeth of the input gear and the drive mechanism will not be misaligned and jam but will properly mesh.

Other features and advantages of the present invention will be apparent to those skilled in the art from a careful reading of the Detailed Description of a Preferred Embodiment presented below and accompanied by the drawings.

BRIEF DESCRIPTION OF THE DRAWINGS

In the drawings,

FIG. 1 is a perspective view of the bracket guide, according to a preferred embodiment of the present invention;

FIG. 2 is an exploded perspective view of the installation with a bracket guide, according to a preferred embodiment of the present invention;

FIG. 3 is a perspective view of the bracket guide installed on a meter, according to a preferred embodiment of the present invention;

DETAILED DESCRIPTION OF A PREFERRED EMBODIMENT

Figure 4A:
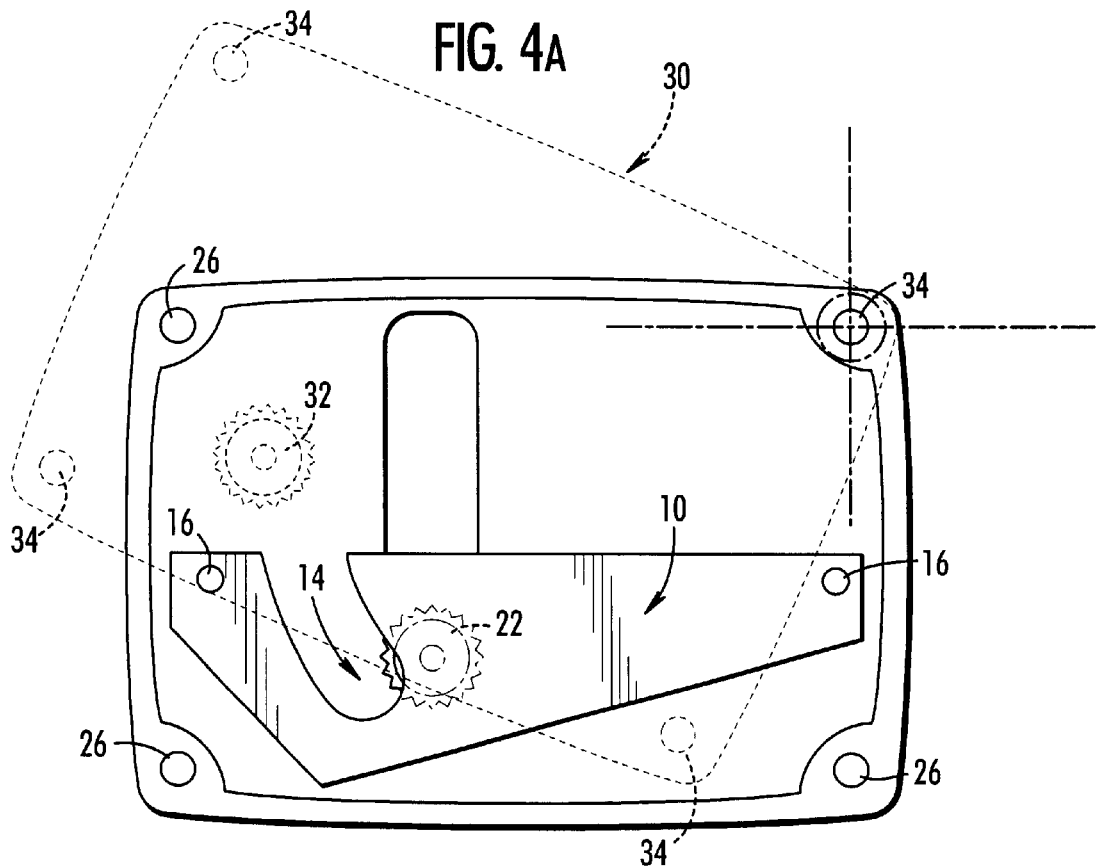
FIG. 4A is a front view of the bracket guide partially installed on a meter prior to rotation of the ERT which is illustrated in ghost, according to a preferred embodiment of the present invention.

Referring now to the figures, the present invention is a process and device for mechanically installing an encoder receiver transmitter (ERT) onto a gas meter. The device is a guide bracket, generally referred to by reference number 10, having a slot 14 for guiding an input gear 32 of an ERT 30 to mesh with a drive mechanism gear 22 of a gas meter 20. Once these two gears are properly meshed, the output of meter 20 can be properly recorded on the ERT 30. By the term mesh, it is meant that the teeth of the gears are engaged. Although bracket 10, is illustrated with a particular meter 20 and ERT 30, it is clear that the dimensions of bracket 10 and curvature of slot 14 could be easily changed to accommodate other meters and ERTs.

Guide bracket 10 has at least one mounting hole 12 that is used for securing it to meter 20; preferably, however, bracket 10 has a pair of holes 12 at opposing ends of bracket 10 each dimensioned to receive a fastener 16. Although any means known in the art for fastening a bracket could be used, such as adhesives, screws, nails, bolts, or the like, preferably fasteners 16 are nylon rivets inserted through mount holes 12 and into index holes 24 on meter 20.

Guide bracket 10 has a slot 14 for receiving and guiding input gear 32 of ERT 30. Guide bracket 10 is preferably dimensioned and formed so that, when guide bracket 10 is attached to meter 20, a portion of drive mechanism gear 22 is exposed through slot 14, as illustrated best in FIG. 3. Slot 14 is arcuate with the upper-right casing hole 26 acting as a pivot point. Depending upon the orientation of drive mechanism 22, slot 14 could be easily curved so that the arcuate segment of slot 14 has a pivot point at any other casing hole. It is important, however, that guide 10 pivot about a point of attachment to meter 20 and that all points along the inner edge of slot 14 be at the same radius from the pivot point.

Although guide bracket 10 could be formed from various metallic materials or wood, preferably it is formed from hard plastic. The exact shape of the balance of guide bracket 10 is not important so long as it is of sufficient dimensions to fit within meter 20 and does not interfere with other structures of meter 20. Bracket 10 should be of sufficient thickness and slot 14 should be of sufficient width to allow input gear 32 to slide through and along slot 14.

Figure 4B:
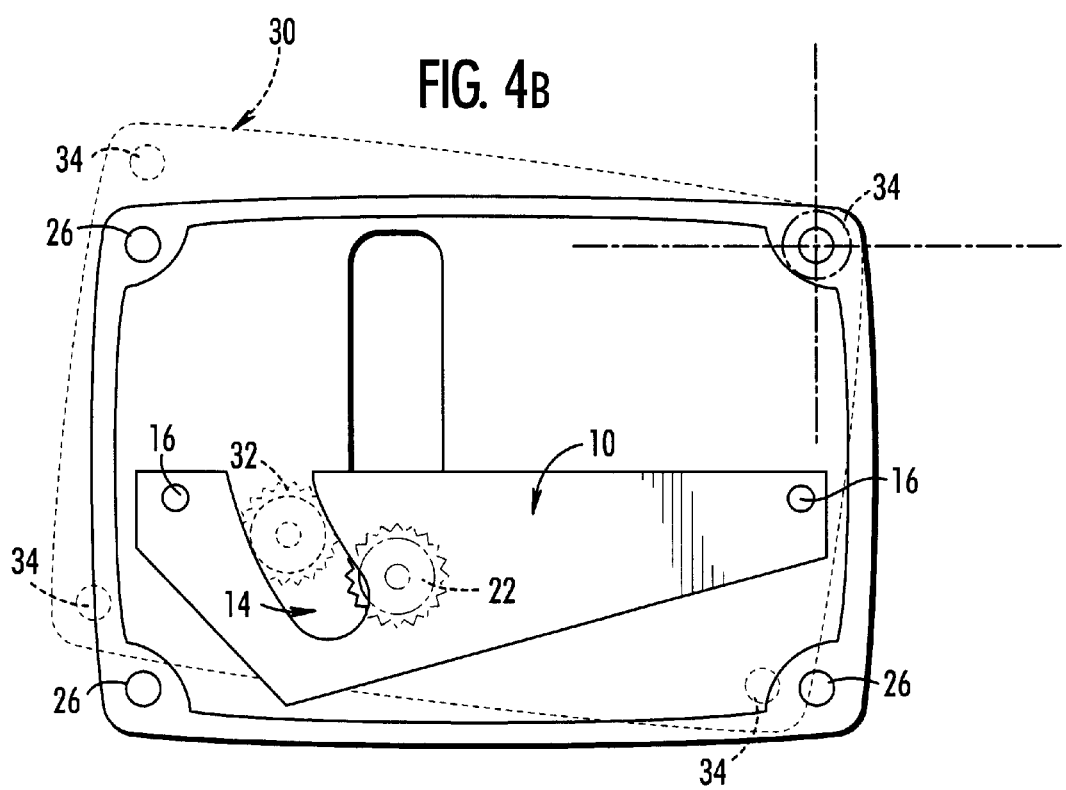
FIG. 4B is a front view of the bracket guide partially installed on a meter after rotation of the ERT which is illustrated in ghost, according to a preferred embodiment of the present invention.
Figure 5:
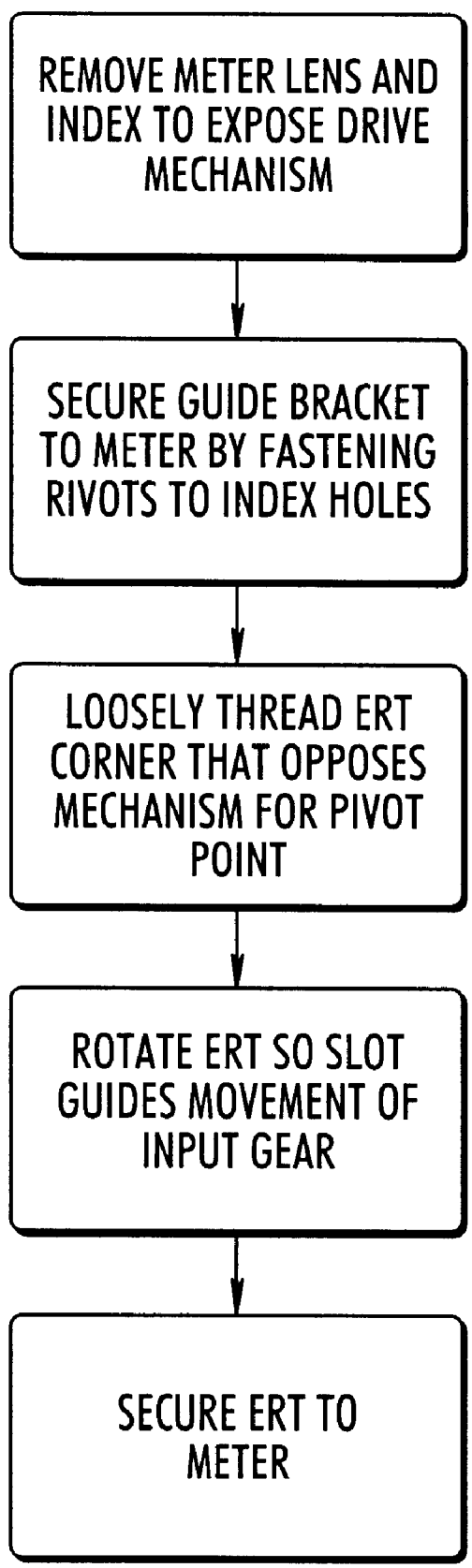
FIG. 5 is a flow chart of the method for installing the ERT, according to a preferred embodiment of the present invention.

In use, guide bracket 10 is used in a method for installing ERT 30, which is illustrated in FIG. 5. First, the customary index and lens are removed so that drive mechanism gear 22 is exposed, as illustrated in FIG. 2. Next, bracket 10 is mounted onto meter 20 by inserting positioning fasteners 16 through mounting holes 12 and into index holes 24, as illustrated in FIG. 3. Once the guide bracket 10 is secured, input gear 32 is slipped through slot 14 at a point away from drive mechanism gear 22 and a screw 36 is loosely threaded into the upper-right installation hole in ERT 30 and through the upper-right casing hole 26 in meter 20 so that ERT 30 is free to pivot about this point. Next, ERT 30 is rotated so that the movement of input gear 32 follows slot 14 in guide bracket 10 as illustrated in FIGS. 4A and 4B until all casing holes 36 align with installation holes 26 of meter 20, input gear 32 is aligned with drive mechanism gear 22 and ERT 30 can be secured. As this point, the teeth of input gear 32 should have meshed with the teeth of drive mechanism gear 22 correctly and fully.

It will be apparent to those skilled in the art that many changes and substitutions can be made to the preferred embodiment herein described without departing from the spirit and scope of the present invention.

What is claimed is:

1. A meter, comprising:

a housing;

a drive mechanism gear carried by said housing;

measuring means carried by said housing for rotating said drive mechanism gear at a rate related to a quantity being measured;

an encoder receiver transmitter having an input gear;

guiding means carried by said housing for meshing said drive mechanism gear with said input gear so that said drive mechanism gear is brought into engagement with and rotates with said input gear when said encoder receiver transmitter is coupled to said measuring means;

means for securing said encoder receiver transmitter to said housing so that said drive mechanism gear remains in engagement with said input gear.

2. The meter as recited in claim 1, wherein said guiding means has a slot formed therein defining a path.

3. The meter as recited in claim 2, wherein said path is arcuate.

4. The meter as recited in claim 2, wherein said slot has a first end and a second end, said input gear being restricted to traveling between said first end and said second end as said encoder receiver transmitter is coupled to said measuring means.

5. The meter as recited in claim 1, wherein said input gear and said drive mechanism gear have teeth.

6. A gas meter, comprising:

a drive mechanism gear;

measuring means for rotating said drive mechanism gear at a rate related to a flow of gas;

an encoder receiver transmitter having an input gear;

guiding means for meshing said drive mechanism gear with said input gear so that said drive mechanism gear is brought into engagement with and rotates with said input gear when said encoder receiver transmitter is coupled to said measuring means; and means for securing said encoder receiver transmitter to said measuring means so that said drive mechanism gear remains in engagement with said input gear.

7. A device for remotely measuring gas usage, said device comprising:

a gas meter having a drive mechanism gear, said drive mechanism gear rotating at a rate dependent on a rate of flow of gas;

an encoder receiver transmitter having an input gear;

guiding means for meshing said drive mechanism gear with said input gear so that, when said encoder receiver transmitter is coupled to said gas meter, said drive mechanism gear is brought into engagement with and rotates with said input gear; and means for securing said encoder receiver transmitter to said housing so that said drive mechanism gear remains in engagement with said input gear.

* * * * *